US009067660B2

(12) United States Patent
Van Steijn et al.

(10) Patent No.: US 9,067,660 B2
(45) Date of Patent: Jun. 30, 2015

(54) SHACKLE ASSEMBLY

(71) Applicants: Theodorus Gerardus Wilhelmus Van Steijn, Linschoten (NL); Klaas-Jan Mulderij, Delfgauw (NL)

(72) Inventors: Theodorus Gerardus Wilhelmus Van Steijn, Linschoten (NL); Klaas-Jan Mulderij, Delfgauw (NL)

(73) Assignee: IHC NOREX B.V., Sliedrecht (NL)

( * ) Notice: Subject to any disclaimer, the term of this patent is extended or adjusted under 35 U.S.C. 154(b) by 0 days.

(21) Appl. No.: 14/364,822

(22) PCT Filed: Dec. 11, 2012

(86) PCT No.: PCT/NL2012/050873
§ 371 (c)(1),
(2) Date: Jun. 12, 2014

(87) PCT Pub. No.: WO2013/095107
PCT Pub. Date: Jun. 27, 2013

(65) Prior Publication Data
US 2015/0101307 A1    Apr. 16, 2015

(30) Foreign Application Priority Data

Dec. 12, 2011    (NL) ...................................... 2007948

(51) Int. Cl.
*B63C 11/52*    (2006.01)
*F16G 15/06*    (2006.01)
*B66C 1/34*    (2006.01)
*F16G 15/04*    (2006.01)

(52) U.S. Cl.
CPC .............. *B63C 11/52* (2013.01); *F16G 15/06* (2013.01); *B66C 1/34* (2013.01); *F16G 15/04* (2013.01)

(58) Field of Classification Search
CPC ............ F16G 15/04; F16G 15/06; B66C 1/34
USPC ......................................................... 59/85, 86
See application file for complete search history.

(56) References Cited

U.S. PATENT DOCUMENTS

| 1,222,997 | A | 4/1917 | Rottmer | |
| 7,134,268 | B2 * | 11/2006 | Siappas | ............................. 59/86 |
| 8,240,728 | B2 * | 8/2012 | Hwang et al. | .............. 294/82.35 |
| 8,539,747 | B2 * | 9/2013 | Abrisketa Lozano | ............ 59/86 |
| 2013/0019582 | A1 | 1/2013 | Abrisketa Lozano | |

FOREIGN PATENT DOCUMENTS

| AU | 2010212330 A1 | 3/2011 |
| JP | 60-137777 A | 9/1985 |
| JP | 62 144283 U | 9/1987 |
| JP | 2000-055141 A | 2/2000 |
| KR | 100631434 B1 | 9/2006 |
| WO | 2006/055581 A2 | 5/2006 |
| WO | 2010074360 A1 | 7/2010 |
| WO | 2011117446 A1 | 9/2011 |

OTHER PUBLICATIONS

International Search Report, dated Apr. 3, 2013, from corresponding PCT application.

* cited by examiner

*Primary Examiner* — David B Jones
(74) *Attorney, Agent, or Firm* — Young & Thompson

(57) ABSTRACT

A shackle assembly including a shackle and a driving device coupled with the shackle for driving a bolt system, which driving device is arranged to reciprocate the bolt system along the longitudinal axis of the bolt system between a shackle installing position and a shackle releasing position, wherein the bolt system includes a locking unit for locking the bolt system in its shackle installing position, and wherein the shackle assembly includes elements for transforming reciprocating movement of the bolt system into rotation of the locking unit around the longitudinal axis of the bolt system between a bolt locking position and a bolt release position of the locking unit.

22 Claims, 3 Drawing Sheets

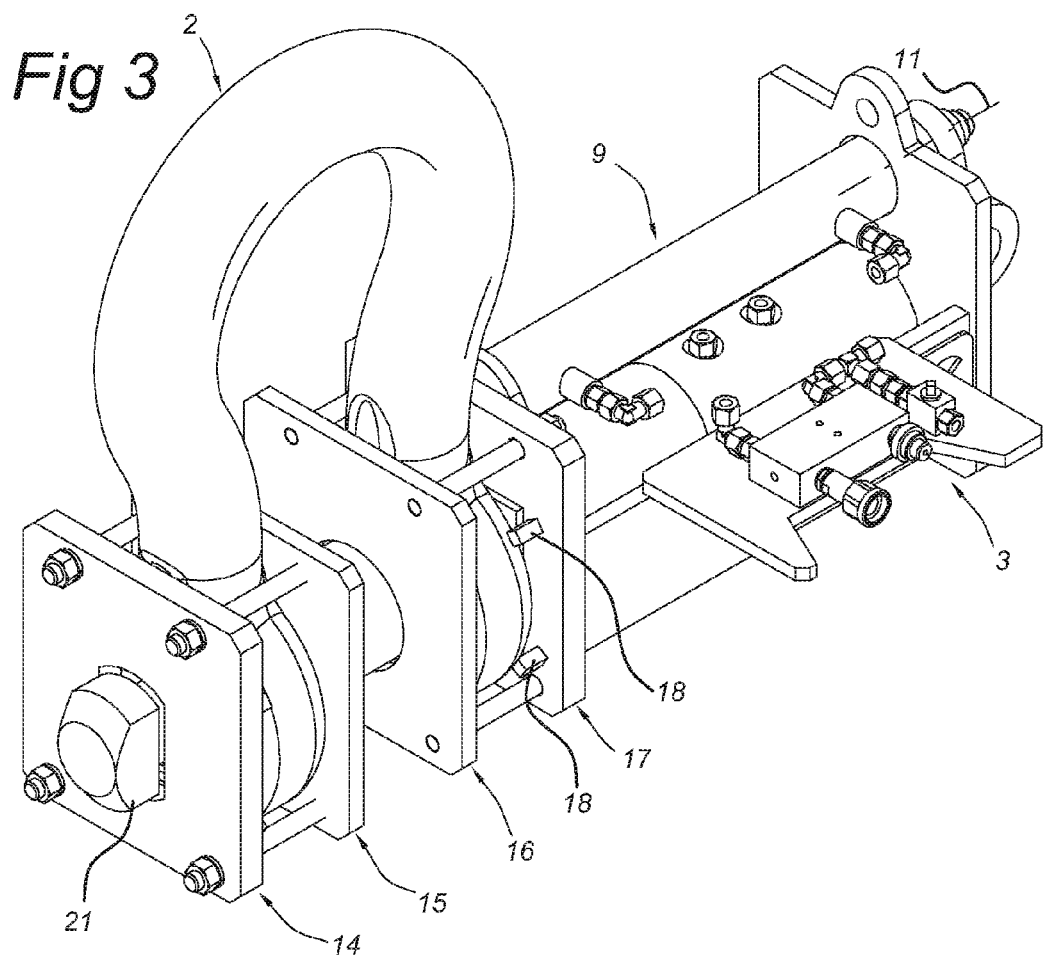
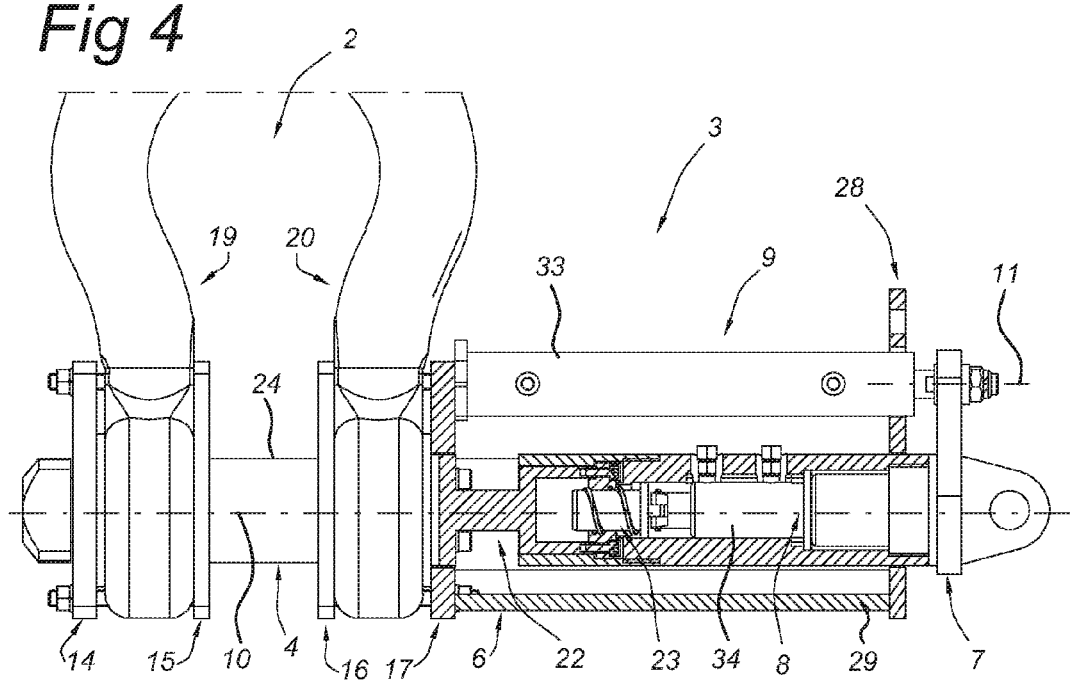

SHACKLE ASSEMBLY

BACKGROUND

The present invention relates to a shackle assembly comprising a shackle and a driving device coupled with the shackle for reciprocating a shackle bolt along the longitudinal axis of the shackle bolt between a shackle installed position and a shackle released position. The shackle assembly is in particular suitable for use in offshore and subsea operations which requires high allowable load and stringent safety standards.

Such a shackle assembly is known from WO 2006/055581 A2 which relates to a shackle assembly and a method for installing and/or releasing the shackle assembly subsea using a shackle pin pulling tool. This tool is separate from the shackle body which allows multiple subsea shackles to be operated with the use of a single hydraulic shackle pin removal or installation tool. Under circumstances this shackle assembly of WO 2006/055581 A2 is unpractical and not safe in use.

WO2011/117446 relates to a shackle connecting device which is intended to connect a shackle to the links of a chain using a bolt. A nut is screwed to the end of the bolt in order to secure the bolt. The nut is screwed to the bolt by an additional robot distinct from the shackle connecting device, which additional robot is costly, cumbersome and undesirable.

SUMMARY OF THE INVENTION

The invention aims to provide a shackle assembly wherein a known problem is at least partially solved.

Another object of the invention is to improve a shackle assembly.

Yet another object of the invention is to provide a shackle assembly which is more safe during operations, in particular offshore operations.

According to a first aspect of the invention this is realized with a shackle bolt and a driving device coupled with the shackle and the shackle bolt for driving the shackle bolt along the longitudinal axis of the shackle bolt between a shackle installed position and a shackle released position, wherein the shackle bolt comprises a locking means for locking the shackle bolt in its shackle installed position, and wherein the shackle assembly comprises means for rotating the shackle bolt around the longitudinal axis of the shackle bolt for moving the locking means between a shackle bolt locked position and a shackle bolt released position.

This provides the possibility of operating the shackle bolt and at the same time locking the shackle bolt which renders operations with the shackle assembly intrinsically safe which is of extreme importance during offshore remotely controlled operations with heavy loads. In addition, the allowable load of the shackle is improved.

In an embodiment of the invention, the means for rotating the shackle bolt comprise means for transforming a shackle bolt driving force along the longitudinal axis of the shackle bolt, into rotation of the shackle bolt around the longitudinal axis of the shackle bolt. This enables use of just one single actuator for the shackle assembly.

In an embodiment of the invention, the means for rotating the shackle bolt comprise a not self-locking threaded connection which connection couples the shackle bolt with the driving device. Such a threaded connection enables a controlled movement of the bolt system without play.

In an embodiment of the invention, the means for rotating the shackle bolt comprise a further driving device. This enables to improve error free operations since it is unlikely that the driving device and the further driving device are subsequently operated by accident such that a load is unintended released from the shackle.

In an embodiment of the invention, the locking means is provided with the leading side of the shackle bolt.

In an embodiment of the invention, the locking means is provided with the shackle bolt, such that the locking means moves with the shackle bolt.

In an embodiment of the invention, the locking means form one part with the shackle bolt. This simplifies the shackle assembly even more.

In an embodiment of the invention, the locking means is integrally formed with the shackle bolt.

In an embodiment of the invention, the shackle assembly comprises a driving device mounting frame for coupling the driving device with the shackle.

In an embodiment of the invention, the driving device comprises an actuating means coupled with the driving device mounting frame and coupled with the shackle bolt for reciprocating the shackle bolt.

In an embodiment of the invention, the further driving device comprises a further actuating means for rotating the shackle bolt In an embodiment of the invention, the shackle bolt is coupled with the driving device via the means for rotating the shackle bolt around the longitudinal axis of the shackle bolt. This simplifies the shackle assembly even more.

In an embodiment of the invention, the shackle assembly comprises a single actuating means of the driving device such that the single actuating means in use drives the shackle bolt along the longitudinal axis of the shackle bolt and rotates the shackle bolt around the longitudinal axis of the shackle bolt. This simplifies the shackle assembly even more.

In an embodiment of the invention, the shackle assembly comprises a shackle bolt mounting frame which couples the shackle bolt with the driving device. This facilitates integration of the means for rotating the shackle bolt with the shackle bolt mounting frame.

In an embodiment of the invention, the means for rotating the shackle bolt comprise a further driving device mounting frame which further driving device mounting frame is moveably coupled with the driving device mounting frame. This enables the addition of a further actuating means.

According to a further aspect of the invention, the driving device is coupled with the driving device mounting frame and the further driving device mounting frame for moving the further driving device mounting frame. This enables improving redundancy of the shackle assembly and/or failure free operations.

In an embodiment of the invention, the further driving device is coupled with the further driving device mounting frame and moves with the further driving device mounting frame.

In an embodiment of the invention, the shackle assembly comprises a shackle mounting plate for mounting with a leg of the shackle. This enables use of a standardized shackle in the shackle assembly and enables an improved mating of the locking means and the recess in the mounting plate.

In an embodiment of the invention, both legs of the shackle are provided with a said mounting plate.

In an embodiment of the invention, at least one of both legs is on both sides provided with a said mounting plate. This improves the coupling between the driving device and the shackle.

In an embodiment of the invention, the mounting plate most remote from the driving system comprises a recess for passing the locking means there through.

In an embodiment of the invention, the locking means and the recess have a corresponding outline for allowing passage of the locking means only when the locking means is in its bolt release position.

The invention further relates to a device comprising one or more of the characterising features described in the description and/or shown in the attached drawings.

The invention further relates to a method comprising one or more of the characterising features described in the description and/or shown in the attached drawings.

The various aspects discussed in this patent can be combined in order to provide additional advantages.

DESCRIPTION OF THE DRAWINGS

The invention will be further elucidated referring to a preferred embodiment shown in the drawing wherein shown in:

FIG. 3 the shackle assembly of FIG. 1 in the shackle installed position and the locking means in the shackle bolt released position;

FIG. 4 the shackle assembly of FIG. 3 in cross sectional side view;

DETAILED DESCRIPTION OF EMBODIMENTS

Figure 1:
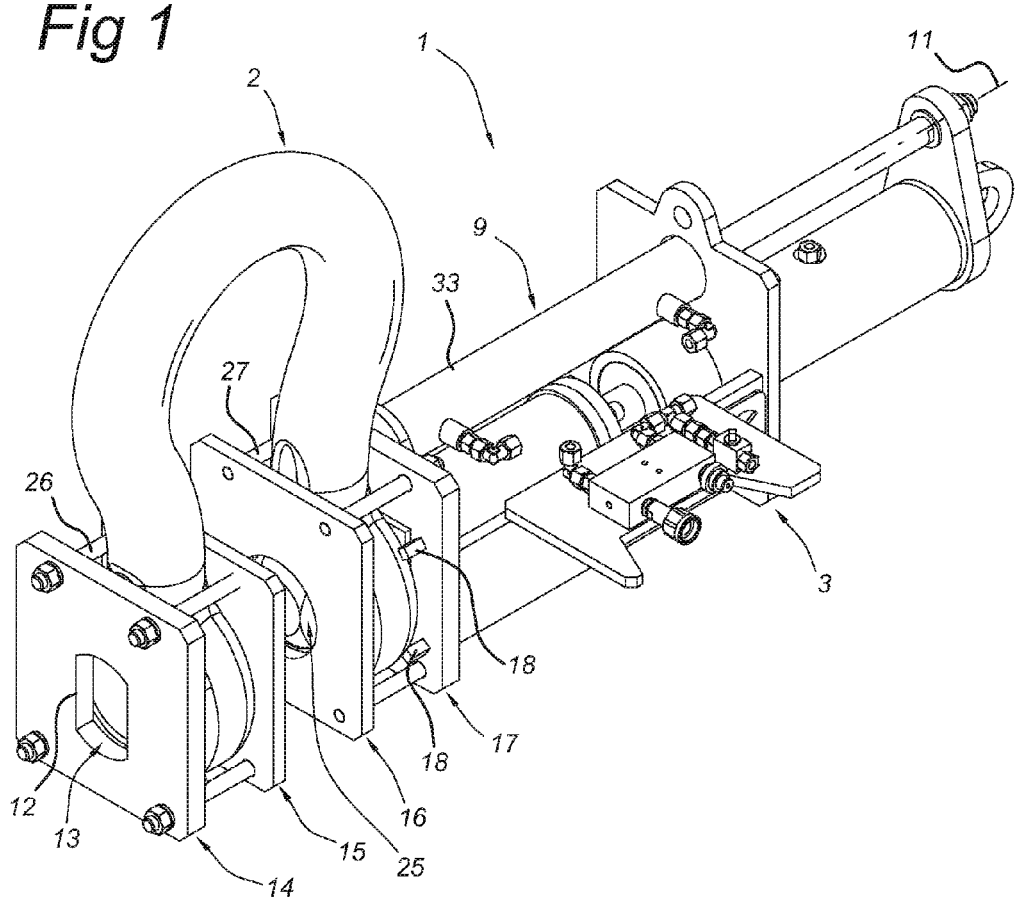
FIG. 1 in perspective view the shackle assemble in the shackle released position.

An embodiment of the shackle assembly is described below, referring to FIG. 1-6.

The shackle assembly 1 comprises a shackle 2 and a driving device 9 coupled with the shackle for driving a shackle bolt 4. The shackle 2 has a U-shape with a first and second leg 19, 20. The second leg 20 faces the driving device 9 and is coupled with the driving device 9. Both the first and second leg are provided with a recess or opening 13, 25 for passing the shackle bolt 4 having a bolt outside surface 24 there through.

The shackle assembly 1 comprises means for rotating the shackle bolt 4 around the longitudinal axis 10 of the shackle bolt for moving the locking means 21. In this case, these means include a further driving device 8, here a hydraulic cylinder, and means for transforming a shackle bolt driving force along the longitudinal axis 10 of the shackle bolt 4, into rotation of the shackle bolt 4 around the longitudinal axis of the shackle bolt. The shackle bolt driving force is exerted by the further driving device 8. It is conceivable that the shackle bolt driving force is exerted by the driving device 9. In addition it is conceivable that the shackle bolt is directly rotated by the further driving device 9 without needing means for transformation.

The shackle 2 is coupled with the driving device 9 by means of a driving device mounting frame 6. The driving device mounting frame 6 has a U-shape in cross section. This U-shape is formed by a base plate 29 and first and second cross-plates 17, 28. The base plate extends parallel relative to the longitudinal axis 10 of the shackle bolt 4. The first cross plate 17, also referred to as shackle mounting plate 17, faces the shackle 2, specifically the second leg 20 of the shackle 2.

The shackle mounting plate 17 is joined with the shackle 2, specifically with the second leg 20, by mounting means 18, 27 and mounting plate 16 such that the shackle 2 and the driving device 9 are fixedly coupled, mutual rotation is prevented and alignment of the shackle 2 and driving device 9 is maintained. In this case, the second leg 20 is provided with mounting plates 17, 16 at both sides of the second leg 20. The shackle mounting plates 14, 15 are joined with the shackle 2, specifically with the first leg 19, by mounting means 26 such that alignment of the locking means 5 and the recess 13 is maintained. All mounting plates are provided with openings 25 to allow passage of the shackle bolt 4. The outermost mounting plate 14, which is the mounting plate most remote from the driving device 9, is provided with a recess 13 with an outline 12 which allows passage of the locking means 5 when the locking means 5 is in its bolt release position shown in FIG. 3. The locking means 5 has an outline 21 which corresponds with the outline 12 of the recess 13 for allowing passage of the locking means 5 only when the locking means 5 is in its bolt release position. Providing mounting plate 14 enables an improved adjustment or fit of the recess 13 with the locking means 5.

Figure 2:
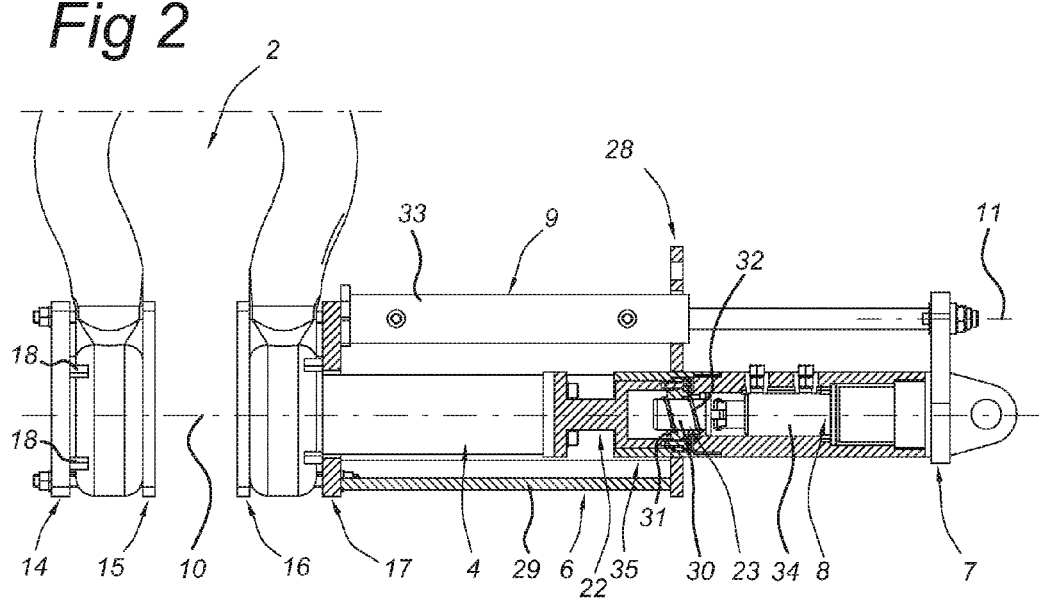
FIG. 2 the shackle assembly of FIG. 1 in cross sectional side view.
Figure 5:
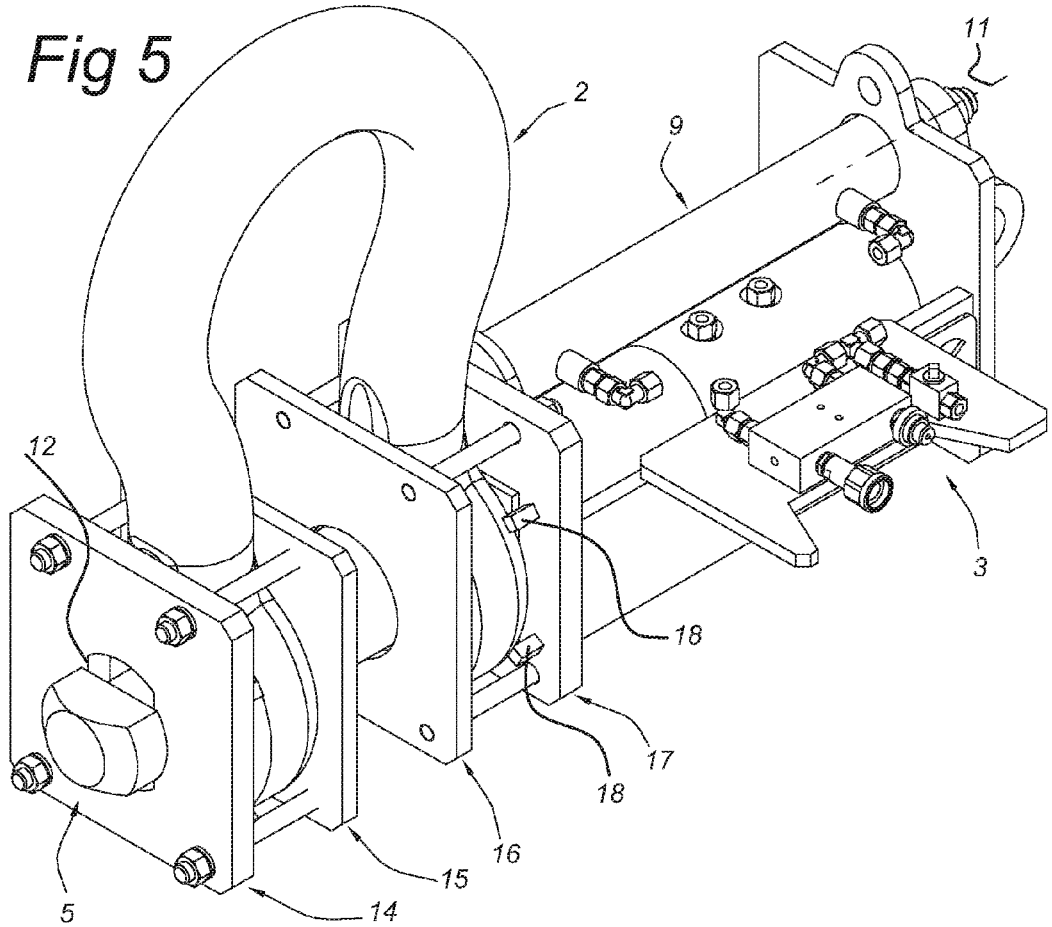
FIG. 5 the shackle assembly of FIG. 1 in the shackle installed position and the locking means in the bolt locked position; and in FIG. 6 the shackle assembly of FIG. 5 in cross sectional side view.
Figure 6:
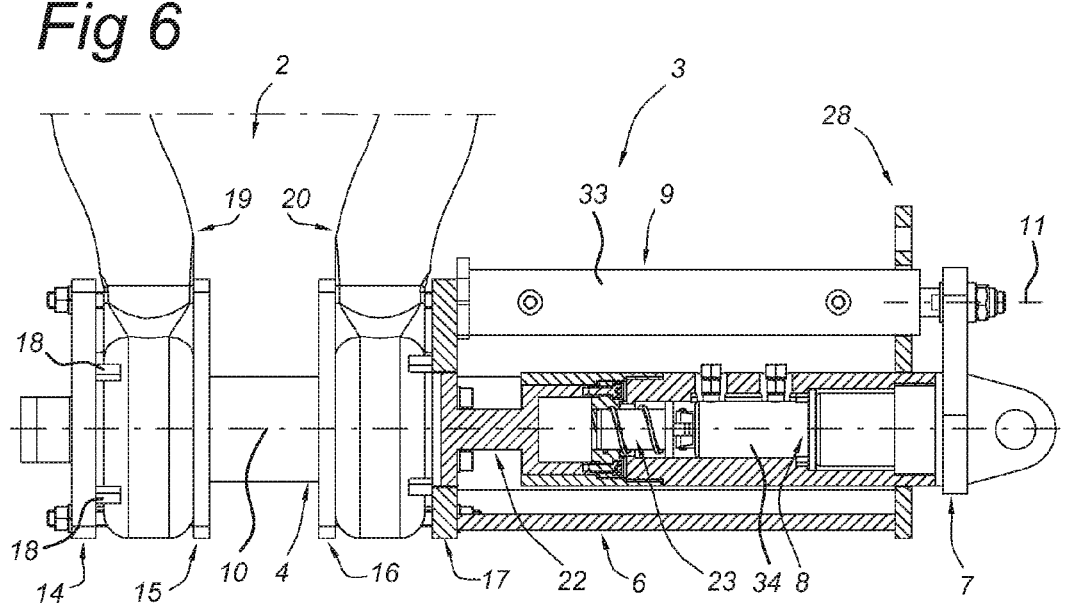

The shackle bolt 4 is moveable between a shackle installed position wherein a load can be transferred by the shackle 2 and a shackle released position shown in FIGS. 1 and 2. Here, the shackle bolt 4 is slideably coupled with the driving device mounting frame 6 to enable reciprocating of the shackle bolt 4. The shackle bolt 4 comprises a locking means 5 for locking the bolt system in its shackle installed position. The locking means 5 is coupled with the shackle bolt 4, such that the locking means 5 moves with the shackle bolt. Moving of the shackle bolt 4 includes reciprocating along the longitudinal axis 10 of the shackle bolt 4 and rotation around the longitudinal axis 10 of the shackle bolt 4. Here, the locking means 5 form one or are of one part with the shackle bolt 4.

The shackle assembly comprises means 30, 31 for transforming a reciprocating movement of the further driving device 8 into rotation of the locking means 5 around the longitudinal axis 10 of the shackle bolt 4 between a bolt locking position and a bolt release position of the locking means 5. Here, the means for transforming a reciprocating movement into rotation comprises a not self-locking threaded connection 23. The not self-locking threaded connection 23 couples the shackle bolt 4 with the driving device 9. Here, the not self-locking threaded connection 23 couples the shackle bolt 24 with the driving device 9 via a further driving device 8. The treaded connection 23 comprises a stationary cylindrical part 30 which is provided with a helical thread 32. Stationary means in this case that the cylindrical part 30 cannot rotate around the longitudinal axis 10 of the shackle bolt 4. The stationary cylindrical part 30 is slideably coupled with the driving device mounting frame 6. The stationary cylindrical part 30 is coupled with the driving device 9 through the further driving device mounting frame 7. The threaded connection 23 comprises a counterpart 31 which complements or mates the stationary cylindrical part 30. The counterpart 31 is fixedly coupled with the shackle bolt 4 by means of a shackle bolt mounting frame 22. The helical thread 32 has a thread angle such that the threaded connection 23 is not self-locking.

In use the cylindrical part 30 is moved through the counterpart 31 which is then forced to rotate accordingly around the longitudinal axis 10 of the shackle bolt 4.

The driving device 9 is arranged to reciprocate the shackle bolt 4 along the longitudinal axis 10 of the shackle bolt 4. The longitudinal axis 10 of the shackle bolt 4 is aligned with the openings 13, 25 of the first and second leg 19, 20.

The further driving device mounting frame 7 supports a further driving device 8, here a hydraulic cylinder 34, coupled with the shackle bolt 4 for rotating the shackle bolt 4. The shackle bolt 4 comprises a bolt mounting frame 22 for coupling the shackle bolt 4 with the further driving device 8. The shackle bolt 4 is coupled with the single hydraulic cylinder 34 of the further driving device 8. The line of action of the single further driving device 8 is aligned with the longitudinal axis 10 of the shackle bolt 4. In this case, the further driving device 8 is a hydraulic cylinder 34. Alignment of the further driving device 8 and the shackle bolt 4 is facilitated by means of a bush bearing arrangement 35.

In this case, the means for rotating the shackle bolt 4 around the longitudinal axis 10 of the shackle bolt comprise a further driving device mounting frame 7 which further driving device mounting frame 7 is moveably coupled with the driving device mounting frame 6. The driving device 9 comprises an actuating means, here a hydraulic cylinder 33, coupled with the driving device mounting frame 6 and the further driving device mounting frame 7 for moving the further driving device mounting frame 7 along the longitudinal axis 10 of the shackle bolt 4. The further driving device 8 is coupled with the further driving device mounting frame 7 and moves with the further driving device mounting frame 7. The further driving device 8 with which the shackle bolt 4 is directly coupled, is series coupled with the driving device 9. The further driving device 8 and the driving device 9 are series coupled through the further driving device mounting frame 7. The shackle bolt 4 is coupled with the driving device 9 via the further driving device 8. Thus the shackle bolt 4 is indirectly coupled with the driving device 9. The line of action 11 of the driving device 9 is parallel relative the line of action 10 of the further driving device 8 which enables introducing redundancy in the shackle system 1 even more.

It will also be obvious after the above description and drawings are included to illustrate some embodiments of the invention, and not to limit the scope of protection. Starting from this disclosure, many more embodiments will be evident to a skilled person which are within the scope of protection and the essence of this invention and which are obvious combinations of prior art techniques and the disclosure of this patent.

The invention claimed is:

1. Shackle assembly (1) comprising a shackle (2), a shackle bolt and a driving device (9) coupled with the shackle and the shackle bolt for driving the shackle bolt along the longitudinal axis of the shackle bolt between a shackle installed position and a shackle released position, wherein the shackle bolt comprises a locking means (5) for locking the shackle bolt in its shackle installed position, and wherein the shackle assembly comprises means for rotating the shackle bolt around the longitudinal axis of the shackle bolt for moving the locking means (5) between a shackle bolt locked position and a shackle bolt released position.

2. Shackle assembly according to claim 1, wherein the means for rotating the shackle bolt comprise means for transforming a shackle bolt driving force along the longitudinal axis of the shackle bolt, into rotation of the shackle bolt around the longitudinal axis of the shackle bolt.

3. Shackle assembly according to claim 1, wherein the means for rotating the shackle bolt comprise a not self-locking threaded connection (23) which connection couples the shackle bolt with the driving device.

4. Shackle assembly according to claim 1, wherein the means for rotating the shackle bolt comprise a further driving device (8).

5. Shackle assembly according to claim 1, wherein the locking means is provided with the leading side of the shackle bolt.

6. Shackle assembly according to claim 1, wherein the locking means is provided with the shackle bolt, such that the locking means moves with the shackle bolt.

7. Shackle assembly according to claim 6, wherein the locking means form one part with the shackle bolt.

8. Shackle assembly according to claim 6, wherein the locking means is integrally formed with the shackle bolt.

9. Shackle assembly according to claim 1, comprising a driving device mounting frame (6) for coupling the driving device with the shackle.

10. Shackle assembly according to claim 9, wherein the driving device comprises an actuating means (33) coupled with the driving device mounting frame (6) and coupled with the shackle bolt for reciprocating the shackle bolt.

11. Shackle assembly according to claim 4, wherein the further driving device comprises a further actuating means (34) for rotating the shackle bolt.

12. Shackle assembly according to claim 1, wherein the shackle bolt is coupled with the driving device via the means for rotating the shackle bolt around the longitudinal axis of the shackle bolt.

13. Shackle assembly according to claim 12, comprising a single actuating means (33) of the driving device such that the single actuating means in use drives the shackle bolt along the longitudinal axis of the shackle bolt and rotates the shackle bolt around the longitudinal axis of the shackle bolt.

14. Shackle assembly according to claim 1, comprising a shackle bolt mounting frame (22) which couples the shackle bolt with the driving device.

15. Shackle assembly according to claim 9, wherein the means for rotating the shackle bolt comprise a further driving device mounting frame (7) which further driving device mounting frame is moveably coupled with the driving device mounting frame.

16. Shackle assembly according to claim 15, wherein the driving device (9) is coupled with the driving device mounting frame and the further driving device mounting frame (7) for moving the further driving device mounting frame (7).

17. Shackle assembly according to claim 15, wherein the further driving device is coupled with the further driving device mounting frame (7) and moves with the further driving device mounting frame (7).

18. Shackle assembly according to claim 1, comprising a shackle mounting plate (14, 15, 16, 17) for mounting with a leg (19, 20) of the shackle.

19. Shackle assembly according to claim 18, wherein both legs of the shackle are provided with a said mounting plate.

20. Shackle assembly according to claim 18, wherein at least one of both legs is on both sides provided with a said mounting plate.

21. Shackle assembly according to claim 18, wherein the mounting plate most remote from the driving system comprises a recess (13) for passing the locking means there through.

22. Shackle assembly according to claim 21, wherein the locking means and the recess have a corresponding outline (12, 21) for allowing passage of the locking means only when the locking means is in its bolt release position.

* * * * *